(No Model.)

E. B. BAKER.
CABLE TERMINAL HEAD AND PROTECTOR.

No. 413,429. Patented Oct. 22, 1889.

WITNESSES:

Ellis B. Baker,
INVENTOR

BY Wight & Worthington
ATTORNEYS.

UNITED STATES PATENT OFFICE.

ELLIS B. BAKER, OF NEW HAVEN, CONNECTICUT.

CABLE TERMINAL HEAD AND PROTECTOR.

SPECIFICATION forming part of Letters Patent No. 413,429, dated October 22, 1889.

Application filed May 23, 1889. Serial No. 311,779. (No model.)

*To all whom it may concern:*

Be it known that I, ELLIS B. BAKER, a citizen of the United States, residing at New Haven, in the county of New Haven and State of Connecticut, have invented certain new and useful Improvements in a Combined Cable Terminal Head and Protector; and I do hereby declare the following to be a full, clear, and exact description of the invention, such as will enable others skilled in the art to which it appertains to make and use the same.

This invention relates to a novel form of connecting device for use in telephone-exchanges or central offices, or at other location forming the termination of an electric cable.

Heretofore it has been customary to lead the cable to a device known as a "terminal head," composed of a box of insulating material—such as hard rubber—having a sealing-gland in its lower end, into which the end of the cable was introduced, and having along its sides the respective binding-posts, to which the wires of the cable were separately connected. The upper end of such a terminal head, after all connections had been made, was then opened and the box filled with a molten insulator, such as paraffine. In using such a device in a telephone-exchange it has been necessary, of course, to connect each one of the wires to its respective parts of the switch-board and other central-office apparatus, and for the purpose of providing protection against lightning and heavy currents which might leak into the cable wires from electric-lighting circuits. The introduction of these devices is tedious and requires individual connections to be made to each of them in turn, and not only is time lost thereby, but a great deal of unnecessary space is taken up by all the devices required.

The object of my invention is to combine the cable terminal head and the protecting devices into a single structure adapted to be made up and fitted at the factory or shop, so that when placed in position at the central office nothing need be done but to make the cable connections and the direct connections to the usual apparatus at the central office.

My invention, therefore, consists in the construction and combination of devices for the above purpose, substantially as hereinafter more fully described and claimed.

Figure 1:
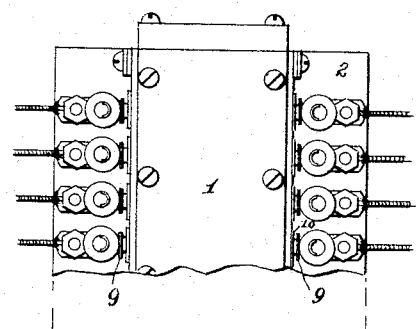
Figure 2:
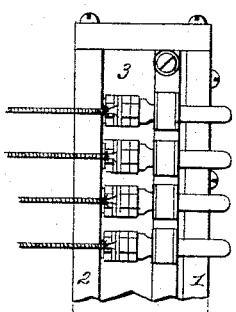
Figure 3:
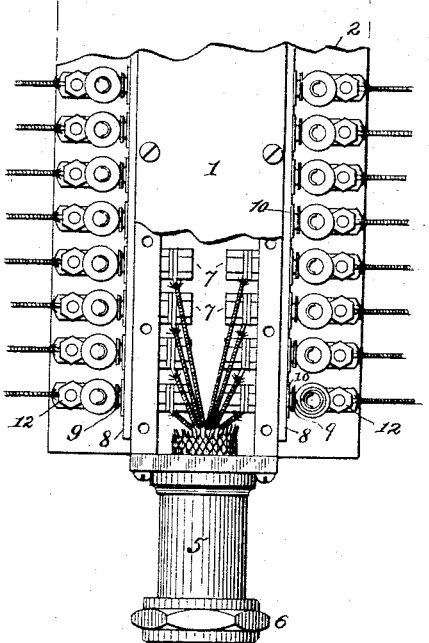
Figure 3:
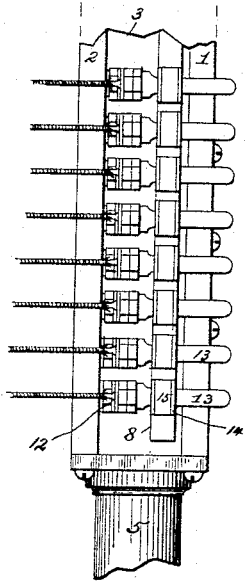
Figure 3:
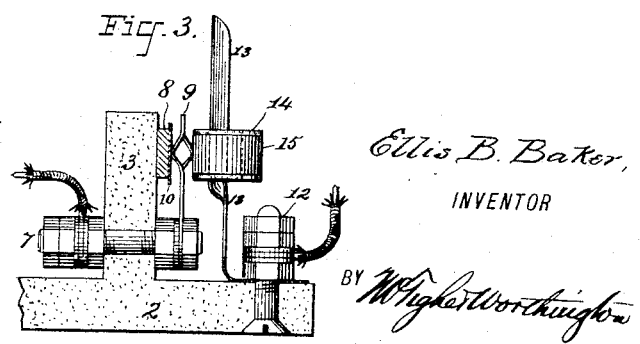

In the drawings, which form part of this specification, Figure 1 is a front elevation of the combined cable terminal head and protecting devices. Fig. 2 is a side elevation of the same; and Fig. 3 is a transverse section of one side of the terminal head, showing the relations of the protecting devices.

The terminal head which I propose to use is composed of the front 1, back 2, and sides 3, which I prefer to make of hard rubber of moderate thickness, forming a box, of which the back 2 is made considerably wider than the front, so as to form a base-board for the attachment of part of the protecting devices. This terminal head is fitted at its lower end with the metallic sleeve or gland 5, terminating with a screw-cap 6, which is provided with packing devices of any suitable nature, and the cable C is passed up through the gland 5, and the cap 6 is then tightened, so as to close up any opening around the cable.

Passing through the sides 3 of the terminal head I arrange the usual binding-posts 7, each of which consists of a bolt provided at each end with nuts, as shown, for facilitating the attachment of the cable wires on the inside and the protecting devices on the outside. The binding-posts 7 are arranged along close to the back 2 of the terminal head. Along a line nearer the front of the sides 3, I fasten a metallic bar 8, which is directly connected to earth. On the outer end of each of the binding-posts 7, I fasten a small metallic plate 9, which I prefer to make of spring-metal—such as hard-rolled brass or German silver. Each of the plates 9 is formed, by preference, with two slits near its upper end, and the two outer strips thus formed are bent inwardly toward the bar 8, and the central strip is bent outwardly, as shown at Fig. 3. The arrangement is such that each of the plates 9 would, if permitted, press inwardly against the bar 8, but is prevented from touching it by the insertion of a small plate of mica 10. The earth-bar 8, mica plate 10, and metallic spring 9, which is connected to one of the cable wires through the binding-posts 7, thus form a very efficient lightning-arrester.

A series of binding-posts 12, fitted with suitable nuts or similar connecting devices, is located along each outer edge of the back 2 of the terminal head, and attached to each of these is a spring-metal tongue 13, rising directly opposite the corresponding terminal spring 9. Each of the tongues 13 is curved into a circular form, and on this is slipped a safety-fuse composed of a strip of insulating material 14—such as asbestus—and a strip of tin-foil 15, the two being rolled into a spool, so that the inner end of the tin-foil makes contact with the tongue 13, and the outer end of the tin-foil is held in direct contact with the terminal spring 9 by the spring-pressure of the tongue 13. I am aware that such form of coiled or spooled safety-fuse is not new, and I lay no claim thereto *per se*.

The terminal head constructed in accordance with the foregoing description may be of any desired size or dimensions, and can be fitted out complete in the factory and placed in position in the exchange, requiring nothing whatever to be done at the exchange but to run the circuit-wires from the switch-board to the binding-posts 12, and when this is done nothing more remains, since the terminal head itself is fully equipped with the lightning-arrester 8 9 10 and the safety-fuse devices comprised in the parts 9, 13, 14, and 15.

Should a lightning-charge pass over any of the cable wires and puncture or otherwise mutilate any of the mica strips 10, the latter may be instantly removed and replaced by a like strip without disconnecting any of the parts; and should one of the fuse-spools 14 15 have its foil melted by the passage of any excessive current leaking from an electric-light or power circuit, duplicates may be kept on hand and a fresh one substituted in a moment.

I claim as my invention—

1. The improved connecting device consisting of the box-shaped terminal head having the bolts 7 passing through its sides and connected inside to the respective cable wires and on the outside having the spring-plates 9 fixed by one end thereto, a metal earth-bar facing the free ends of the row of spring-plates, and separately-removable interposed slips of non-conducting material, substantially as described.

2. The improved connecting device comprising, in a single structure, the box-shaped terminal head composed of front 1, sides 3, and widened back 2, binding-posts extending through the sides 3 and forming the terminals of the cable wires, local circuit binding-posts on the widened back provided with spring-blades 13, adapted when free to make contact with the cable terminals, and interposed removable safety-fuses mounted on the said spring-blades and forming the circuit between the cable terminals and the spring-blades attached to the local circuit binding-posts.

In testimony whereof I affix my signature in presence of two witnesses.

ELLIS B. BAKER.

Witnesses:
FREDERIC P. LEWIS,
E. N. CLARKE.